Dec. 23, 1952 P. W. GAENSSLE 2,622,705
BRAKE MECHANISM
Filed Aug. 31, 1950
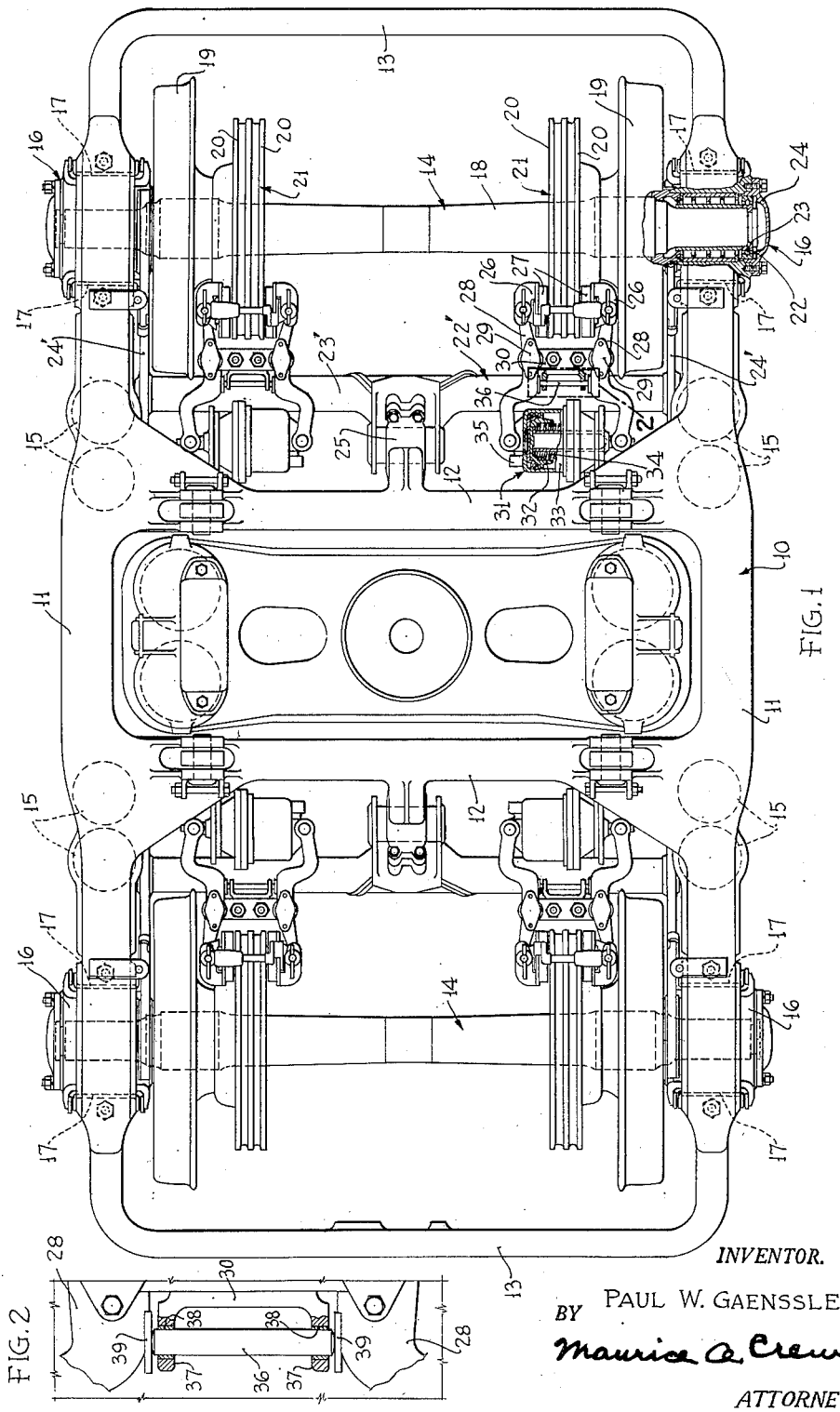
INVENTOR.
PAUL W. GAENSSLE
BY Maurice A. Crews
ATTORNEY Patented Dec. 23, 1952

2,622,705

UNITED STATES PATENT OFFICE 2,622,705

BRAKE MECHANISM

Paul W. Gaenssle, Ambler, Pa., assignor to The Budd Company, Philadelphia, Pa., a corporation of Pennsylvania Application August 31, 1950, Serial No. 182,454

3 Claims. (Cl. 188—59)

The invention relates to brake mechanism and more particularly to radially faced brake mechanism in association with a railway truck.

The invention is particularly concerned with brake mechanism carried for the most part by a U- or C-shaped support having its ends resting on, for lateral movement with, the journal boxes at the ends of a wheel and axle assembly and carrying shoes which cooperate with radial braking faces carried by a rotary disc or the like, mounted on the wheel and axle assembly to move laterally therewith.

In such an arrangement, it is desirable that the brake shoes are spaced but a very slight distance from the adjacent cooperative braking faces, when the brakes are released, so that but a small volume of fluid need be displaced to apply the brakes, and so that the brakes may be quickly applied. With such a slight spacing, especially if the axle carrying the braking faces has considerable lateral play in the journal boxes, there is difficulty, if fixed stops are employed to limit the return movement of the shoes, not only from the forceable contact of the shoes with the braking face at the limits of the lateral movements of the axle, but also when the axle is in the extreme lateral position, it becomes difficult to apply and remove certain of the shoes, particularly shoes having the desired lining thickness.

It is a main object of the invention to avoid these difficulties, and this without changing the general organization of the brake mechanism with relation to the trucks.

This is accomplished, according to the invention, by the provision of a floating stop means, for limiting the return movement of the shoes from the braking position. With such a stop means the shoes can be moved laterally to provide clearance between them and the rotary braking faces with which they cooperate, even when the axle is at the extreme limit of its relative lateral movement with respect to the journal boxes in which it is mounted. This object and other and further objects and advantages and the manner in which they are attained will become apparent from the following detailed description when read in connection with the drawings forming a part of this specification.

In the drawings:

Fig. 1 is a plan view, parts being broken away and shown in section, of a truck to which the invention is shown applied; and Fig. 2 is an enlarged detail view of the floating stop means, the view being taken in the region of the dot-and-dash rectangle 2 of Fig. 1.

In the embodiment of the invention selected for illustration, the truck is shown of conventional form, including a frame 10, having longitudinally extending side members 11, 11, interconnected intermediate the ends by spaced transoms 12, 12, and at the ends by end transoms 13, 13. The frame is supported adjacent its ends by wheel and axle assemblies 14, 14, through the usual spring nests, diagrammatically indicated at 15, interposed between the frame and the usual equalizers (not shown) resting on top of the journal boxes 16. The journal boxes are guided, for vertical movement with respect to the frame, by the usual pedestal guides 17, 17.

Each wheel and axle assembly comprises an axle, as 18, journalled in the journal boxes 16, 16 at its ends and carrying the spaced wheels 19, 19 adjacent the opposite ends thereof. With each wheel and axle assembly is also associated, adjacent each of the opposite ends thereof, a pair of radially extending rotary braking faces 20, 20, which are shown, in this instance, as carried by a brake disc 21 mounted on the axle, one adjacent each wheel 19.

As shown in the section at the right bottom of Fig. 1, the axles are mounted in the journal boxes so as to have slight lateral play indicated by the space 22 between the axle bearing 23 and the journal box cap 24. It is because of this lateral play that the invention is made necessary or desirable. Such play may be designedly provided or it may result from prolonged wear. Since the discs 21, 21 are fixedly carried by the axle, it will be seen that these also partake of this limited lateral movement.

The brake mechanism cooperating with the discs associated with an axle is mounted on a U- or C-shaped support 22' comprising a transverse member 23' and members 24', 24' extending longitudinally and resting on the respective journal boxes without appreciable lateral movement with respect thereto. The braking torque is transmitted to the frame 10 through a usual connection 25 with the adjacent transom 12.

The brake mechanism cooperating with each disc 21 comprises a pair of brake heads 26, 26 carrying endwise removable shoes 27, 27 arranged in closely spaced cooperative relation, when the brakes are off, with the opposite faces 20, 20 of the disc. These brake heads and the associated shoes are pivotally carried by brake levers 28, 28 which in turn are pivoted at 29, 29 to a bracket 30 on the transverse member 23' of the brake support. At their ends remote from the shoes the levers 28, 28 are interconnected by the actuating cylinder 31. This cylinder, as shown, comprises a piston 32 pivotally connected to one lever and a cylinder 33 pivotally connected to the other lever. A return spring 34 within the cylinder normally acts to return the parts to the inoperative position shown. When fluid pressure is admitted to the pressure side of the piston through a port indicated at 35, the levers and shoes are moved to apply the brakes. It will be understood that pressure is simultaneously admitted in like manner to all the brakes to apply them.

Heretofore, it has been the practice to provide fixed stops to limit the return movement of the parts when the braking pressure is released. According to the invention, floating stop means are provided, which maintain a predetermined spacing between the shoes, but allow the shoes to float laterally to provide the necessary clearances between the shoes and discs at all times. This not only prevents injury to the parts of the brake mechanism when the axle moves laterally to its extreme limits, but makes it possible to readily remove and replace the shoes, even if the axle has moved to either lateral limit of its movement in the journal boxes.

Such laterally floating stop means may comprise a laterally floating hardened pin 36 guided in openings in spaced arms 37, 37 on the bracket 30. The openings are provided with bearing bushings 38, 38 which minimize wear and permit replacement, if desired. The ends of this pin 36 are rounded and engage hardened plates 39, 39, fixedly secured to the respective levers 28, 28, when the parts of the brake mechanism are moved to the inoperative position by the return spring 34. The ends of the guide arms 37 constitute fixed stops at either end against which the plates 39 engage after the pin 36 has been pushed entirely within its guide at one end. This prevents the shoe on the opposite side from riding against the brake surface.

With this arrangement, it will be seen that if the axle moves laterally in the journal boxes to the extreme limit of its movement, this movement exceeding the normal spacing between the shoe lining and disc, the shoes and stop pin are free to float laterally to allow this without placing undue strain on the parts. Also, if it is desired to replace a shoe when the axle is in either of its extreme lateral positions, clearance for such replacement can be readily achieved by applying lateral pressure to the remote ends of the levers and moving said ends and the floating stop pin laterally the desired distance.

While a specific embodiment of the invention has been herein described in detail, it will be understood that changes and modifications may be made by those skilled in the art without departing from the spirit and scope of the invention as expressed in the appended claims.

What is claimed is:

1. In combination, a truck frame, a wheel and axle assembly supporting one end thereof, said wheel and axle assembly comprising an axle, a pair of wheels carried thereby, a pair of brake discs, one associated with each of said wheels, and a pair of journal boxes, one at each of the axle ends, pedestals on the frame in which said journal boxes are guided for vertical movement with respect to the frame, a brake support carried at its ends by said journal boxes, brake shoes mounted in cooperative relation with the opposite faces of the respective discs, means for mounting the shoes on the support including a pair of brake levers for each disc pivotally carrying the respective shoes associated with a disc and themselves pivoted to the support intermediate their ends, a cylinder actuator operatively interposed between the ends of said pair of levers remote from the shoes for actuating the shoes into braking engagement with the disc, means for returning said shoes to inoperative position, and stop means for limiting the return movement of the shoes, said stop means including floating stop means which limits the outward movement of the brake shoes away from each other and fixed stop means which limits the floating movement of the brake shoes together after engagement of the floating stop means to prevent engagement of the brake shoes with the brake surfaces when the brakes are in their off position.

2. In combination, a truck frame, a wheel and axle assembly supporting one end thereof, said wheel and axle assembly comprising an axle having limited lateral movement in journal boxes supporting its ends, a pair of wheels carried by said axle, and a pair of brake discs, one associated with each of said wheels, pedestals on the frame in which the journal boxes are guided for vertical movement with respect to the frame, a brake support carried at its ends by said journal boxes, brake shoes mounted in cooperative relation with the opposite faces of said discs, means for mounting the shoes on the support including a pair of brake levers for each disc pivotally carrying the respective shoes associated with a disc and themselves pivoted to the support intermediate their ends, a cylinder actuator operatively interposed between the ends of said pair of levers remote from the shoes for actuating the shoes into braking engagement with the disc, means for returning said shoes to inoperative position, stop means for limiting the return movement of the shoes, said stop means being floatingly mounted on the support for lateral movement to provide clearance between the shoes and their associated discs when the axle is moved laterally in the journal boxes to one or the other limit of its lateral movement relative thereto, and fixed stop means associated with the support for the floating stop means to limit the movement of the brake shoes to prevent them from engaging the brake surfaces in their conjoint floating movement when they are in the off position irrespective of the lateral movement of the brake discs.

3. In combination, a pair of radially extending rotary braking faces and a pair of brake shoes cooperatively arranged with respect thereto and carried by a support having limited relative lateral movement with respect to said faces, means for carrying said shoes from the support comprising a pair of levers pivoted on the support intermediate their ends and having the shoes pivoted, respectively, to one of their ends, a cylinder actuator operatively disposed between the other of their ends for actuating the shoes into braking engagement, means for returning the shoes to inoperative position, and stop means for limiting the return movement of the shoes, said stop means comprising a laterally floating pin carried by the support and having its ends in cooperative relation with the respective brake levers, and fixed stop means associated with the support for the floating stop pin to limit the movement of the brake shoes to prevent them from engaging the brake surfaces in their conjoint floating movement when they are in the off position irrespective of the lateral movement of the brake discs.

PAUL W. GAENSSLE.

REFERENCES CITED

The following references are of record in the file of this patent:

UNITED STATES PATENTS

| Number | Name | Date |
|---|---|---|
| 670,943 | Carlson | Apr. 2, 1908 |
| 2,198,027 | Farmer | Apr. 23, 1940 |
| 2,239,086 | Eksergian | Apr. 22, 1941 |
| 2,342,083 | Ledwinka | Feb. 14, 1944 |
| 2,363,453 | Tack | Nov. 21, 1944 |